United States Patent
Nishida et al.

(10) Patent No.: US 7,731,623 B2
(45) Date of Patent: Jun. 8, 2010

(54) AUTOMATIC TRANSMISSION

(75) Inventors: Masaaki Nishida, Anjo (JP); Hiroshi Katou, Anjo (JP); Masashi Kitou, Anjo (JP); Kohei Iizuka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 335 days.

(21) Appl. No.: 12/071,566

(22) Filed: Feb. 22, 2008

(65) Prior Publication Data

US 2008/0207385 A1    Aug. 28, 2008

(30) Foreign Application Priority Data

| Feb. 23, 2007 | (JP) | ............................. 2007-043279 |
| Jul. 5, 2007 | (JP) | ............................. 2007-177824 |
| Jul. 5, 2007 | (JP) | ............................. 2007-177825 |
| Jul. 5, 2007 | (JP) | ............................. 2007-177826 |
| Jul. 5, 2007 | (JP) | ............................. 2007-177827 |
| Jul. 24, 2007 | (JP) | ............................. 2007-192688 |

(51) Int. Cl.
 *F16H 3/62* (2006.01)
 *F16D 47/04* (2006.01)
(52) U.S. Cl. ................................. 475/275; 192/48.619
(58) Field of Classification Search ................. 475/146, 475/275
 See application file for complete search history.

(56) References Cited

U.S. PATENT DOCUMENTS

| 4,732,253 | A | * | 3/1988 | Hiramatsu et al. ...... | 192/48.618 |
| 5,887,690 | A | * | 3/1999 | Haupt .................... | 192/48.611 |
| 6,021,879 | A | * | 2/2000 | Pelouch ................... | 192/106 F |
| 6,454,074 | B1 | * | 9/2002 | Kundermann et al. .. | 192/48.618 |
| 7,416,069 | B2 | * | 8/2008 | Tiesler ................... | 192/48.611 |
| 2007/0060438 | A1 | | 3/2007 | Fukuyama et al. | |
| 2007/0184932 | A1 | | 8/2007 | Tabata et al. | |
| 2008/0202884 | A1 | * | 8/2008 | Nishida et al. ........... | 192/106 F |
| 2008/0207384 | A1 | * | 8/2008 | Nishida et al. ............. | 475/276 |
| 2008/0207385 | A1 | * | 8/2008 | Nishida et al. ............. | 475/276 |
| 2008/0207386 | A1 | * | 8/2008 | Nishida et al. ............. | 475/276 |
| 2008/0220928 | A1 | * | 9/2008 | Nishida et al. ............. | 475/275 |
| 2009/0011892 | A1 | * | 1/2009 | Nishida et al. ............. | 475/276 |
| 2009/0017954 | A1 | * | 1/2009 | Nishida et al. ............. | 475/159 |
| 2009/0029820 | A1 | * | 1/2009 | Nishida et al. ............. | 475/159 |

FOREIGN PATENT DOCUMENTS

| JP | A-07-269665 | 10/1995 |
| JP | U-3121527 | 4/2006 |
| JP | A-2006-342845 | 12/2006 |
| JP | A-2007-032624 | 2/2007 |
| WO | WO 2005/026579 A1 | 3/2005 |
| WO | WO 2006/132291 A1 | 12/2006 |

* cited by examiner

*Primary Examiner*—Dirk Wright
(74) *Attorney, Agent, or Firm*—Oliff & Berridge, PLC

(57) ABSTRACT

An automatic transmission includes two clutches that are disposed such that they overlap in an axial direction and occupy different positions in a radial direction. Each of the two clutches includes a clutch drum, a piston that forms a working fluid chamber for which a portion of the clutch drum serves as a cylinder, a plurality of friction plates that engage the clutch drum, and a cancel oil chamber that is disposed on a rear face side of the piston and that cancels a centrifugal oil pressure that acts on the working fluid chamber.

6 Claims, 5 Drawing Sheets

F I G . 1
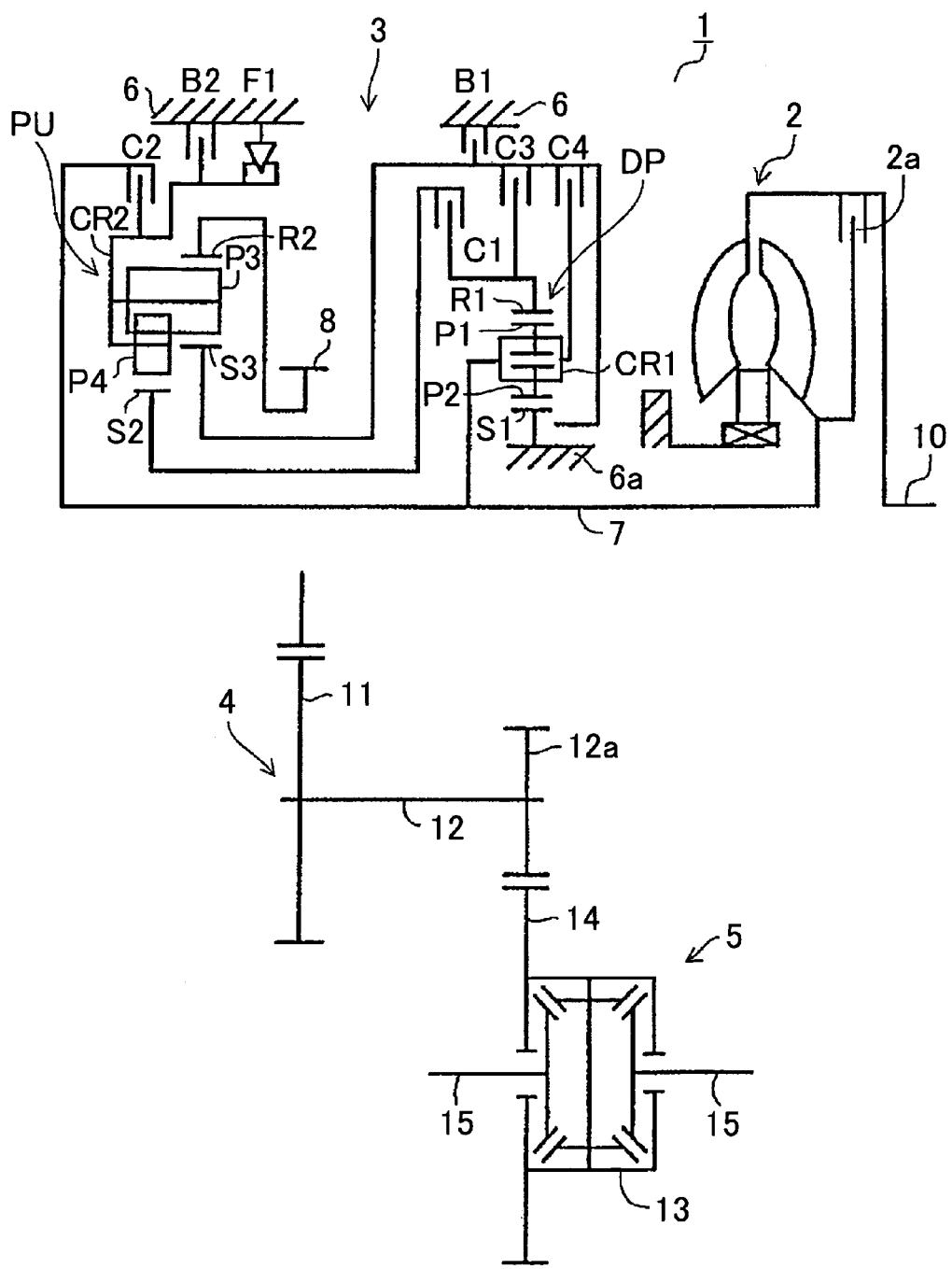

FIG.2

|   | C1 | C2 | C3 | C4 | B1 | B2 | F1 |
|---|---|---|---|---|---|---|---|
| 1st | ● |   |   |   |   | (●) | ● |
| 2nd | ● |   |   |   | ● |   |   |
| 3rd | ● |   | ● |   |   |   |   |
| 4th | ● |   |   | ● |   |   |   |
| 5th | ● | ● |   |   |   |   |   |
| 6th |   | ● |   | ● |   |   |   |
| 7th |   | ● | ● |   |   |   |   |
| 8th |   | ● |   |   | ● |   |   |
| Rev1 |   |   | ● |   |   | ● |   |
| Rev2 |   |   |   | ● |   | ● |   |

(●) DENOTES BEING CARRIED OUT DURING ENGINE BRAKING

F I G . 5
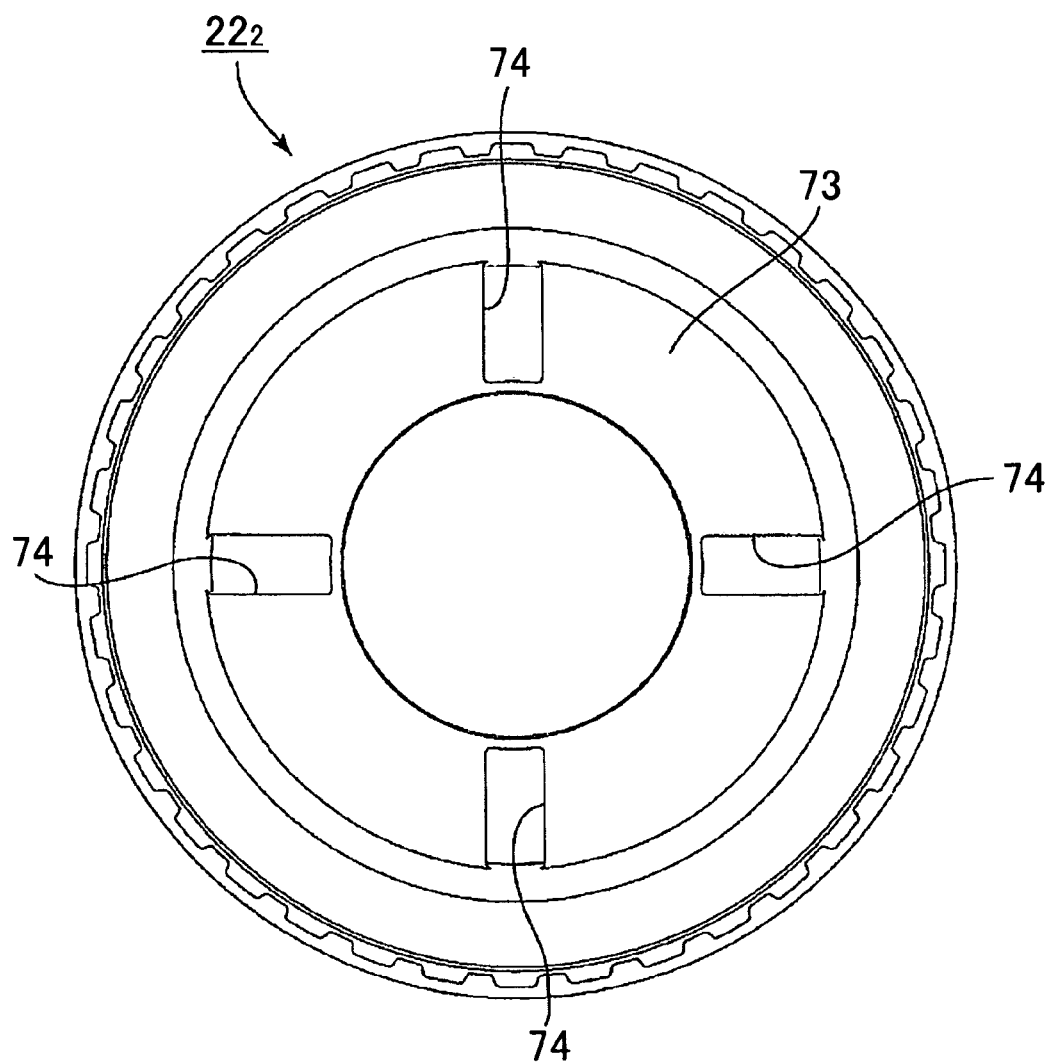

AUTOMATIC TRANSMISSION

INCORPORATION BY REFERENCE

The disclosure of Japanese Patent Application No. 2007-192688 filed on Jul. 24, 2007, Japanese Patent Application No. 2007-043279 filed on Feb. 23, 2007, Japanese Patent Application No. 2007-177825 filed on Jul. 5, 2007, Japanese Patent Application No. 2007-177826 filed on Jul. 5, 2007, Japanese Patent Application No. 2007-177827 filed on Jul. 5, 2007, and Japanese Patent Application No. 2007-177824 filed on Jul. 5, 2007 including the specifications, drawings and abstracts are incorporated herein by reference in their entirety.

BACKGROUND

The present invention relates to an automatic transmission.

Recently, an automatic transmission that is installed in a vehicle is required to have a plurality of speeds, such as eight forward speeds, for example. The automatic transmission is also required to have its structural parts, such as clutches, for example, arranged such that the automatic transmission will be compact, making it easier to install.

There exists an automatic transmission (see, for example, Japanese Patent Application Publication No. JP-A-7-269665) that attempts to achieve a compact structure, in particular, compactness in the axial direction, by arranging two clutches such that they overlap in the axial direction and are positioned differently in the radial direction. In the two clutches, either the input or output member is provided as a common member, and the other is provided as a separate member. In each of the two clutches, a plurality of friction plates, a working fluid chamber that operates the friction plates, and a cancel oil chamber that cancels centrifugal oil pressure the working fluid chamber, are disposed such that they overlap in the axial direction.

The two working fluid chambers and cancel oil chambers are disposed in a clutch drum that forms a single unit with a turbine shaft. Hydraulic pressure is supplied to the two working fluid chambers through an oil passage that is formed in a boss portion of the clutch drum. One of the two cancel oil chambers that is located to the inside in the radial direction is directly supplied with oil through an oil hole that is formed in the boss portion of the clutch drum. The oil from the cancel oil chamber to the inside in the radial direction is supplied to the other of the two cancel oil chambers, which is located to the outside in the radial direction, through an oil passage that is provided in a piston for a clutch to the inside in the radial direction and through the oil passage that is formed in the boss portion of the clutch drum to the inside in the radial direction, which is a securing member.

SUMMARY

In the two clutches, the oil passage structure by which the hydraulic pressure (that is, the oil) is supplied to the working fluid chambers and the cancel oil chambers is complex. The oil passages that supply the oil to the cancel oil chamber to the outside in the radial direction are particularly complex. When the clutch to the outside in the radial direction is released and the hydraulic pressure in the working fluid chamber is discharged, the oil is rapidly supplied to the cancel oil chamber to the outside in the radial direction, which may make it difficult to achieve appropriate clutch timing.

Moreover, in order to form the oil passage to the cancel oil chamber to the outside in the radial direction, an O-ring for the oil passage must be positioned to the outside of an O-ring for the working fluid chamber on the piston that is to the inside in the radial direction. This interferes with making the transmission more compact in the axial direction.

The present invention provides an automatic transmission having a compact configuration, particularly in the axial direction, and is able to supply a required amount of oil quickly to a cancel oil chamber to the outside in the radial direction. The present invention is also able to achieve other advantages.

According to an exemplary aspect of the present invention, an automatic transmission includes two clutches that are disposed such that they overlap in an axial direction and occupy different positions in a radial direction. Each of the two clutches includes a clutch drum, a piston that forms a working fluid chamber for which a portion of the clutch drum serves as a cylinder, a plurality of friction plates that engage the clutch drum, and a cancel oil chamber that is disposed on a rear face side of the piston and that cancels a centrifugal oil pressure that acts on the working fluid chamber. The working fluid chamber and the cancel oil chamber of one clutch of the two clutches that is disposed outside in the radial direction are respectively disposed to the outside in the radial direction in relation to the working fluid chamber and the cancel oil chamber of the other clutch of the two clutches. Oil is supplied to the cancel oil chamber of the one clutch of the two clutches that is disposed to the outside in the radial direction through a gap between the clutch drum of the other clutch of the two clutches and the clutch drum of the one clutch of the two clutches that is disposed to the outside in the radial direction.

DESCRIPTION OF THE DRAWINGS

Various exemplary aspects of the invention will be described with reference to the drawings, wherein:

FIG. 1 is a skeleton diagram that schematically shows an automatic transmission according to the present embodiment;

FIG. 2 is an engagement chart for the automatic transmission according to the present embodiment;

FIG. 5 is a plan view of an outer drum according to the second embodiment, seen from the rear.

DETAILED DESCRIPTION OF EMBODIMENTS

Preferred embodiments of the present invention will be explained below with reference to FIGS. 1 to 5.

Figure 3:
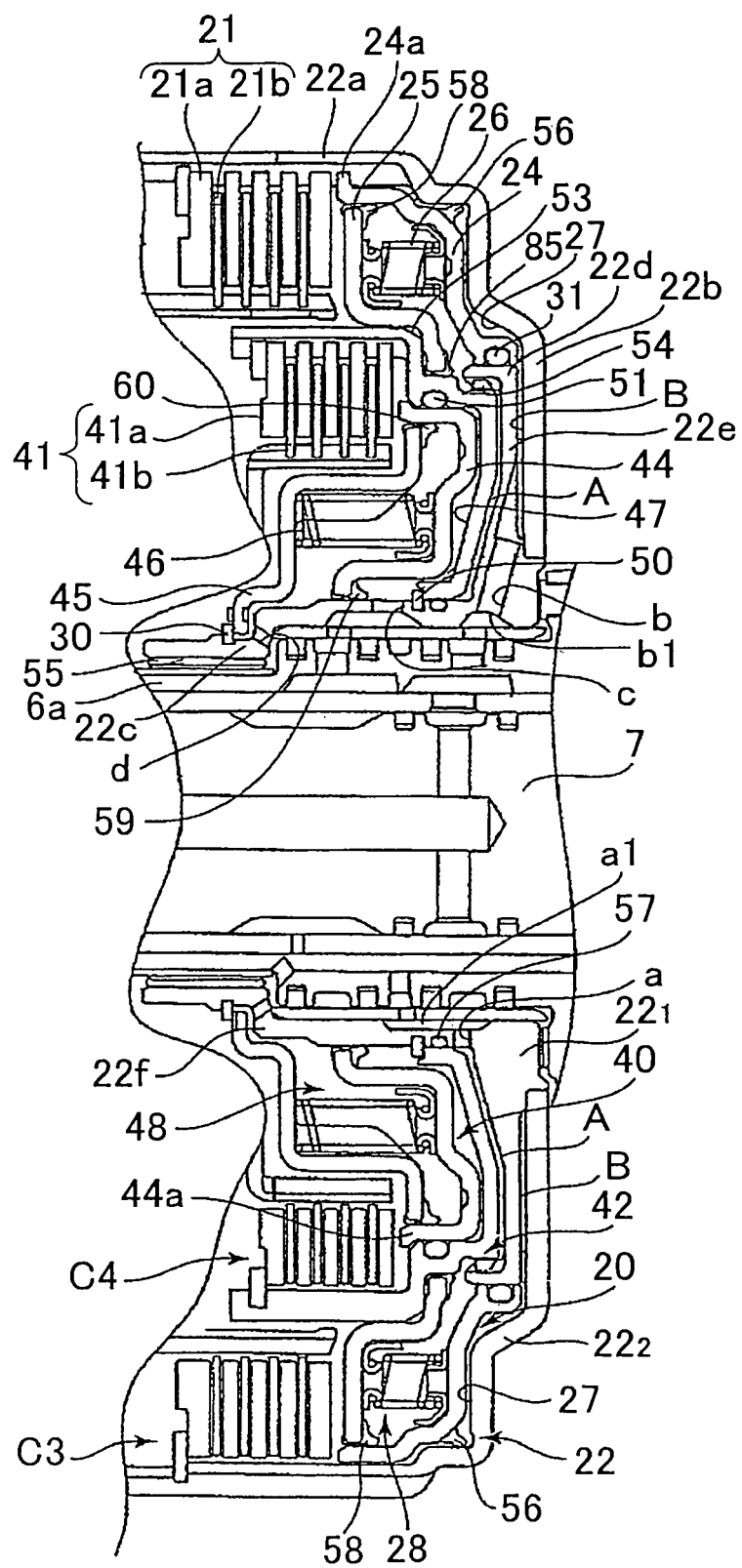
FIG. 3 is an enlarged sectional view that shows a portion of an automatic transmission according to a first embodiment.
Figure 4:
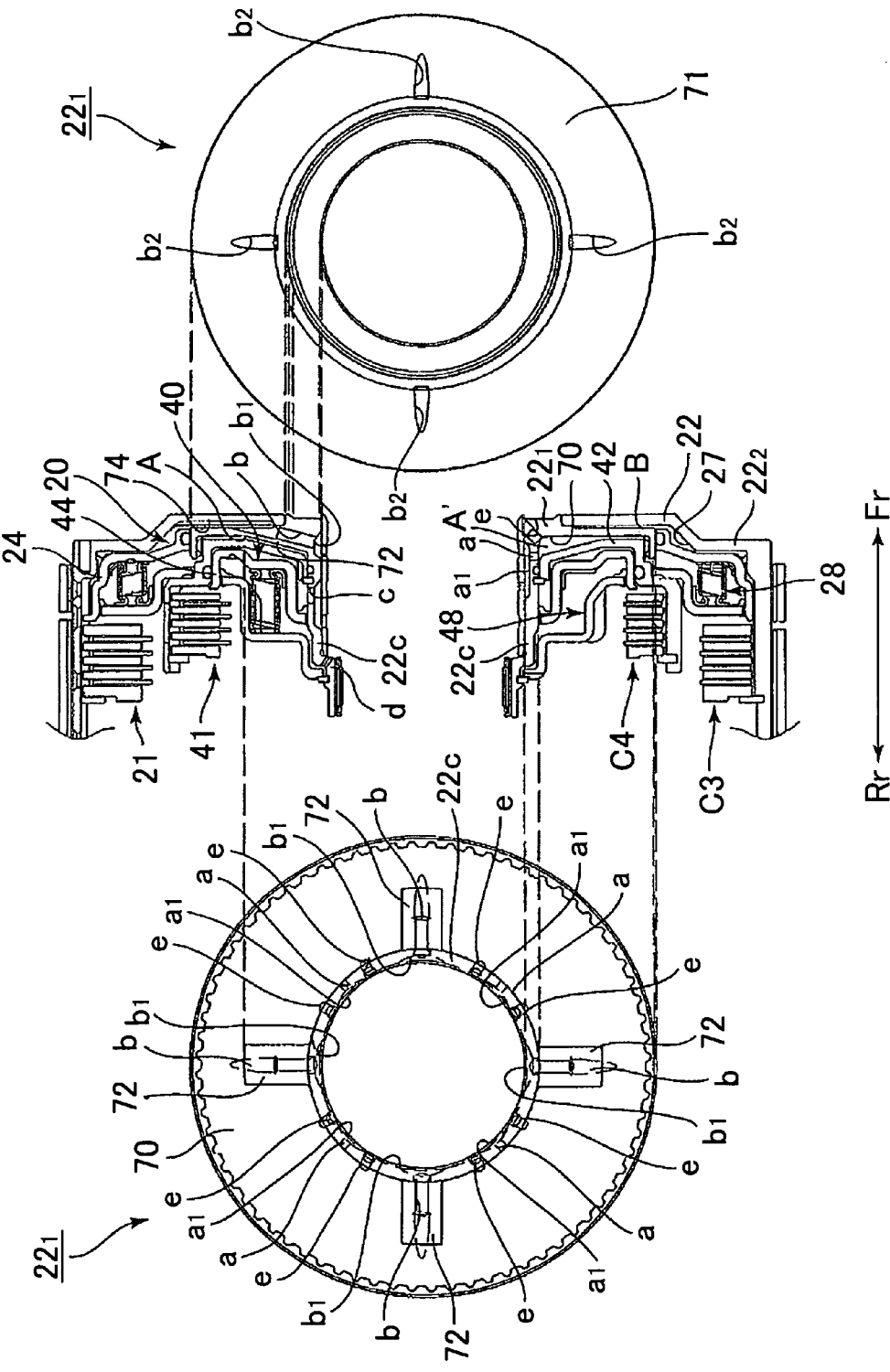
FIG. 4A is a plan view of an inner drum according to a second embodiment, seen from the rear.
FIG. 4B is an enlarged sectional view that shows a portion of an automatic transmission according to the second embodiment.
FIG. 4C is a plan view of the inner drum according to the second embodiment, seen from the front.

An automatic transmission according to the present invention is a preferred automatic transmission for installation in a vehicle of the front engine, front wheel drive (FF) type or the like. In FIGS. 1, 3 and 4, the horizontal direction corresponds to the longitudinal direction of a power transmission path (a drive power source side and a wheel side are referred to as a front side and a rear side, respectively) of the automatic transmission in its installed state in the vehicle. For the purposes of the explanation that follows, the right side of the drawings, which is the side where a drive power source such as an engine or the like is located, is the front side, and the left side is the rear side.

First, the overall configuration of an exemplary automatic transmission 1 will be explained with reference to FIG. 1. As shown in FIG. 1, the automatic transmission 1 for the FF type vehicle includes a case 6 such as a housing case and a transmission case. The front side of the case (specifically, the converter housing) 6 has an input member (front cover and center piece) 10 by which the automatic transmission 1 can be connected to an engine (not shown in the drawings). A torque converter 2 that has a lock-up clutch 2a is also disposed in the automatic transmission 1. A speed change mechanism 3, a countershaft portion 4, and a differential portion 5 are also disposed within the case 6.

The torque converter 2 is disposed on an axis that is centered on an input shaft 7 of the speed change mechanism 3 that is on the same axis as an output shaft of the engine (not shown in the drawings). The countershaft portion 4 is disposed on a countershaft 12 that is on an axis that is parallel to the input shaft 7. The differential portion 5 is arranged in a form that has left and right axles 15, 15 parallel to the countershaft 12.

A planetary gear (deceleration planetary gear) DP is provided on the input shaft 7 in the speed change mechanism 3. A planetary gear unit (planetary gear set) PU is provided to the rear of the planetary gear DP.

The planetary gear DP includes a first sun gear S1, a first carrier CR1, and a first ring gear R1. The planetary gear DP is a so-called double pinion planetary gear in which a pinion P2 that meshes with the first sun gear S1 and a pinion P1 that meshes with the first ring gear R1 both mesh with the first carrier CR1.

On the other hand, the planetary gear unit PU includes, as four rotating elements, a second sun gear S2, a third sun gear S3, a second carrier CR2, and a second ring gear R2. The planetary gear unit PU is a so-called Ravigneaux type planetary gear in which a pinion P3 that meshes with the third sun gear S3 and the second ring gear R2 and a pinion P4 that meshes with the second sun gear S2 both mesh with the second carrier CR2.

The rotation of the first sun gear S1 of the planetary gear DP is stationary in relation to the case 6. The first carrier CR1 is connected to the input shaft 7 and rotates together with the rotation of the input shaft 7 (hereinafter called the "input rotation"). The first carrier CR1 is also connected to a fourth clutch C4. The stationary first sun gear S1 and the first carrier CR1 that does the input rotation cause the first ring gear R1 to do deceleration rotation that decelerates the input rotation. The first ring gear R1 is also connected to a first clutch C1 and a third clutch C3.

The third sun gear S3 of the planetary gear unit PU is connected to a first brake B1 and is stationary in relation to the case 6. The third sun gear S3 is also connected to the fourth clutch C4 and the third clutch C3. The input rotation of the first carrier CR1 through the fourth clutch C4 and the deceleration rotation of the first ring gear R1 through the third clutch C3 are input to the third sun gear S3. The second sun gear S2 is connected to a first clutch C1, and the deceleration rotation of the first ring gear R1 is input to the second sun gear S2.

The second carrier CR2 is connected to a second clutch C2 into which the rotation of the input shaft 7 is input and through which the input rotation is input to the second carrier CR2. The second carrier CR2 is also connected to a one-way clutch F1 and a second brake B2. The rotation that is input through the one-way clutch F1 is restricted to a rotation in one direction in relation to the case (specifically, the transmission case) 6, and the rotation that is input through the second brake B2 is stationary. The second ring gear R2 is connected to a counter gear 8 that is rotatably supported in relation to a center support member that is fixed to the case 6.

A large diameter gear 11 that is fixed on the countershaft 12 of the countershaft portion 4 meshes with the counter gear 8. A gear 14 of the differential portion 5 meshes with the countershaft 12 through a small diameter gear 12a that is formed on the outer perimeter surface of the countershaft 12. The gear 14 is fixed to a differential gear 13 and is connected to the left and right axles 15, 15 through the differential gear 13.

Next, based on the configuration described above, the operation of the speed change mechanism 3 will be explained with reference to FIGS. 1 and 2.

For example, in a first forward (1st) speed of the Drive (D) range, as shown in FIG. 2, the first clutch C1 and the one-way clutch F1 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The rotation of the second carrier CR2 is restricted to the one direction (the forward rotation direction), that is, the second carrier CR2 is in a fixed state in which reverse rotation is prevented. Thus the deceleration rotation that is input to the second sun gear S2 is output to the second ring gear R2 through the fixed second carrier CR2, and the forward rotation is output as the first forward speed from the counter gear 8.

Note that during engine braking (during coasting), the second brake B2 is engaged and the second carrier CR2 is stationary, such that the first forward speed state is maintained in a form that prevents the forward rotation of the second carrier CR2. Moreover, in the first forward speed, the reverse rotation of the second carrier CR2 is prevented by the one-way clutch F1, while the forward rotation is permitted, so the shift into the first forward speed, such as when a shift is made from the non-drive range to the drive range, for example, can be accomplished smoothly by the automatic engagement of the one-way clutch F1.

In a second forward (2nd) speed, the first clutch C1 is engaged, and the first brake B1 is engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the first brake B1 also makes the rotation of the third sun gear S3 stationary. In this state, the deceleration rotation of the second carrier CR2 becomes slower than that of the second sun gear S2, such that the deceleration rotation that is input to the second sun gear S2 is output through the second carrier CR2 to the second ring gear R2, and the forward rotation is output as the second forward speed from the counter gear 8.

In a third forward (3rd) speed, the first clutch C1 and the third clutch C3 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the third clutch C3 also causes the deceleration rotation of the first ring gear R1 to be input to the third sun gear S3. In other words, the deceleration rotation of the first ring gear R1 is input to the third sun gear S3 and the second sun gear S2, so the planetary gear unit becomes directly coupled to the deceleration rotation. The deceleration rotation is thus output to the second ring gear R2, and the forward rotation is output as the third forward speed from the counter gear 8.

In a fourth forward (4th) speed, the first clutch C1 and the fourth clutch C4 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the fourth clutch C4 also causes the input rotation of the first carrier CR1 to be input to the third sun gear S3. The deceleration rotation of the second carrier CR2 thus becomes faster than that of the second sun gear S2, such that the deceleration rotation that is input to the second sun gear S2 is output through the second carrier CR2 to the second ring gear R2, and the forward rotation is output as the fourth forward speed from the counter gear 8.

In a fifth forward (5th) speed, the first clutch C1 and the second clutch C2 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the second clutch C2 also causes the input rotation to be input to the second carrier CR2. In this state, the deceleration rotation that is input to the second sun gear S2 and the input rotation that is input to the second carrier CR2 make the deceleration rotation faster than in the fourth forward speed, such that the deceleration rotation is output to the second ring gear R2, and the forward rotation is output as the fifth forward speed from the counter gear 8.

In a sixth forward (6th) speed, the second clutch C2 and the fourth clutch C4 are engaged. The engaging of the fourth clutch C4 causes the input rotation of the first carrier CR1 to be input to the third sun gear S3. The engaging of the second clutch C2 causes the input rotation to be input to the second carrier CR2. In other words, the input rotation is input to the third sun gear S3 and the second carrier CR2, so the planetary gear unit becomes directly coupled to the input rotation. The input rotation is thus output to the second ring gear R2, and the forward rotation is output as the sixth forward speed from the counter gear 8.

In a seventh forward (7th) speed, the second clutch C2 and the third clutch C3 are engaged. In this state, the first sun gear S1, which is stationary, and the first carrier CR1, which does the input rotation, cause the rotation of the first ring gear R1, which does the deceleration rotation, to be input to the third sun gear S3 through the third clutch C3. The engaging of the second clutch C2 causes the input rotation to be input to the second carrier CR2. In this state, the deceleration rotation that is input to the third sun gear S3 and the input rotation that is input to the second carrier CR2 make the deceleration rotation slightly faster than the input rotation, such that the deceleration rotation is output to the second ring gear R2, and the forward rotation is output as the seventh forward speed from the counter gear 8.

In an eighth forward (8th) speed, the second clutch C2 is engaged, and the first brake B1 is engaged. The engaging of the second clutch C2 causes the input rotation to be input to the second carrier CR2. The engaging of the first brake B1 also makes the rotation of the third sun gear S3 stationary. Because the third sun gear S3 is stationary, the input rotation of the second carrier CR2 becomes faster than in the seventh forward speed, such that the input rotation is output to the second ring gear R2, and the forward rotation is output as the eighth forward speed from the counter gear 8.

In a first reverse (Rev1) speed, the third clutch C3 is engaged, and the second brake B2 is engaged. In this state, the first sun gear S1, which is stationary, and the first carrier CR1, which does the input rotation, cause the rotation of the first ring gear R1, which does the deceleration rotation, to be input to the third sun gear S3 through the third clutch C3. The engaging of the second brake B2 also makes the rotation of the second carrier CR2 stationary. The deceleration rotation that is input to the third sun gear S3 is thus output to the second ring gear R2 through the stationary second carrier CR2, and the reverse rotation is output as the first reverse speed from the counter gear 8.

In a second reverse (Rev2) speed, the fourth clutch C4 is engaged, and the second brake B2 is engaged. The engaging of the fourth clutch C4 causes the input rotation of the first carrier CR1 to be input to the third sun gear S3. The engaging of the second brake B2 also makes the rotation of the second carrier CR2 stationary. The input rotation that is input to the third sun gear S3 is thus output to the second ring gear R2 through the stationary second carrier CR2, and the reverse rotation is output as the second reverse speed from the counter gear 8.

Note that in the Park (P) range and the Neutral (N) range, the first clutch C1, the second clutch C2, the third clutch C3, and the fourth clutch C4 are released. In these states, the first carrier CR1 and the third sun gear S3 are not connected, and the first ring gear R1, the third sun gear S3, and the second sun gear S2 are not connected. That is, the planetary gear DP and the planetary gear unit PU are not connected. Furthermore, the input shaft 7 and the second carrier CR2 are not connected. This means that the transmission of power between the input shaft 7 and the planetary gear unit PU is cut off. In other words, the transmission of power between the input shaft 7 and the counter gear 8 is cut off.

Next, a configuration of a third clutch C3 (a clutch that is positioned to the outside in the radial direction) and a fourth clutch C4 (a clutch that is positioned to the inside in the radial direction) in an automatic transmission 1 according to a first embodiment of the present invention will be explained with reference to FIG. 3. The fourth clutch C4 is positioned to the inside in the radial direction and is disposed such that it is enveloped by the third clutch C3 in a two-level configuration. That is, the third clutch C3 is positioned to the outside of the fourth clutch C4 in the radial direction, and is disposed such that it overlaps the fourth clutch C4 in the axial direction and occupies a different position in the radial direction.

The hydraulic servo 20 of the third clutch C3 includes a clutch drum 22, a piston member 24, a cancel plate 25, and a return spring 26. These elements form a working fluid chamber 27 and also form the cancel oil chamber 28 to the rear. The clutch drum 22 is a single unit that is formed by an inner drum (inner circumference member) 221 and an outer drum (outer circumference member) 222 that are joined by welding or the like. The inner drum 221 includes a boss portion 22*c* and a piston support portion 22*e*. The outer drum 222 includes a drum portion 22*a* and a bottom portion 22*b*. The outer circumference side of the drum portion 22*a* extends to the rear of a first clutch C1 (not shown in the drawing). The boss portion 22*c* is rotatably supported by a stator shaft (fixing member) 6*a* through a bush 55. The boss portion 22*c* and the drum portion 22*a* are linked by the bottom portion 22*b*. Note that the converter housing and the transmission case are integrally connected and designated as the case 6. In addition, the case and the members integrated with the case are fixing members, which include the case, an oil pump cover and its case, the stator shaft 6*a* and the like. Therefore, the first sun gear S1 and the boss portion 22*c* of the clutch drum 22 may be fixed and rotatably supported by any fixing member such as the case or the fixing members integrated with the case as well as the stator shaft 6*a*, respectively.

At a central location in the bottom portion 22b of the clutch drum 22, a flange portion 22d is formed at an outer circumference of the piston support portion 22e, which extends outward in the radial direction from the boss portion 22c. The flange portion 22d extends for a considerably shorter distance than the drum portion 22a and the boss portion 22c and in the same direction as do the drum portion 22a and the boss portion 22c. An outer perimeter face of the flange portion 22d is linked in an oil-tight manner to the piston member 24 through an O-ring 31. An inner perimeter face of the flange portion 22d is joined to a clutch drum 42 of the fourth clutch C4, described later, through a spline coupling 54.

The piston member 24 is linked to the flange portion 22d such that the piston member 24 can move freely in the axial direction. An outer perimeter face of the piston member 24 is linked to an inner perimeter face of the clutch drum 22 in an oil-tight manner through a sealing member 56. The working fluid chamber 27 is formed by the piston member 24 and the inner perimeter face of the clutch drum 22, which forms a cylinder. The piston member 24 also includes an extension portion 24a that extends toward the rear. The third clutch C3 is engaged and disengaged by the pressing of the extension portion 24a on the friction plates 21.

The axial direction position of the clutch drum 42 of the fourth clutch C4 is restricted by a snap ring 50 in the boss portion 22c of the third clutch C3. The clutch drum 42 is joined to the boss portion 22c in an oil-tight manner through an O-ring 57. The clutch drum 42 also includes a step portion 53 to the rear of the spline coupling 54 that joins the clutch drum 42 to the flange portion 22d of the third clutch C3.

The cancel plate 25 of the third clutch C3 abuts against the step portion 53 that is provided on the clutch drum 42 of the fourth clutch C4 so as to be restricted to the rearward movement in the axial direction. An outer perimeter of the cancel plate 25 is joined to the piston member 24 in an oil-tight manner through a sealing member 58. An inner perimeter portion of the cancel plate 25 is joined to the clutch drum 42 of the fourth clutch C4 in an oil-tight manner through a sealing member 85. The cancel oil chamber 28, which generates hydraulic pressure that counterbalances the centrifugal oil pressure that is generated by the working fluid chamber 27 of the third clutch C3, is formed by the outer perimeter face of the cancel plate 25 and the inner perimeter face of the piston member 24. The return spring 26 is disposed between the cancel plate 25 and the piston member 24 and constantly energizes the piston member 24 toward the front. Note that for the return spring 26, a spring is used that has a stronger energizing force than does a return spring 46 that is provided in the cancel oil chamber 48 of the fourth clutch C4.

Oil is supplied from an oil hole b to the working fluid chamber 27 of the third clutch C3 through a gap B that is provided between the piston support portion 22e of the inner drum 221 and the bottom portion 22b of the outer drum 222. The gap B is provided such that it covers the entire circular plane between the piston support portion 22e of the inner drum 221 and the bottom portion 22b of the outer drum 222. The gap B is therefore a short (narrow) space in the axial direction and has a large oil passage sectional area in proportion to the oil hole.

Lubricating oil is supplied from an oil hole a to the cancel oil chamber 28 of the third clutch C3 through a gap A that is provided between the clutch drum 42 of the fourth clutch C4 and the rear face of the piston support portion 22e of the inner drum 221 of the third clutch C3. The gap A is provided such that it forms a plane around the entire circumference. Therefore, while the gap A maintains a narrow interval in the axial direction between the clutch drums 22 and 42 (thereby making the axial direction dimension more compact), it has a large oil passage sectional area in proportion to the oil hole. Note that the spline coupling 54 that is provided between the clutch drum 42 of the fourth clutch C4 and the flange portion 22e of the third clutch C3 is formed such that some of its teeth are omitted so that they will not interfere with the oil flow in the oil passage.

The hydraulic servo 40 of the fourth clutch C4 includes the clutch drum 42, a piston member 44, a cancel plate 45, and the return spring 46. These elements form a working fluid chamber 47 and also form the cancel oil chamber 48 to the rear.

The piston member 44 is joined to the boss portion 22c of the clutch drum 22 of the third clutch C3 in an oil-tight manner through a sealing member 59 and is installed such that it can move in the axial direction. The piston member 44 also includes an extension portion 44a that presses on the friction plates 41. An outer perimeter face of the extension portion 44a and an inner perimeter face of the clutch drum 42 are joined in an oil-tight manner through an O-ring 51.

The working fluid chamber 47 of the fourth clutch C4 is formed by an outer perimeter face of the piston member 44 and the inner perimeter face of the clutch drum 42, which forms a cylinder. The working fluid chamber 47 is configured such that oil is supplied through an oil hole c.

The cancel plate 45 of the fourth clutch C4 is provided such that its axial direction position is restricted by a step portion 22f of the boss portion 22c of the clutch drum 22 of the third clutch C3 and by a snap ring 30. The cancel plate 45 is joined to an inner perimeter face of the piston member 44 in an oil-tight manner through a sealing member 60.

The cancel oil chamber 48, which generates hydraulic pressure that counterbalances the centrifugal oil pressure that is generated by the working fluid chamber 47 of the fourth clutch C4, is formed by the inner side face of the cancel plate 45 and the rear face of the piston member 44. The return spring 46 is disposed between the piston member 44 and the cancel plate 45 and constantly energizes the piston member 44 toward the front. Lubricating oil is supplied to the cancel oil chamber 48 from an oil hole d.

Next, a second embodiment that provides a larger oil passage sectional area for the working fluid chamber 27 and the cancel oil chamber 28 of the third clutch C3 will be explained based on FIGS. 4A, 4B, 4C, and 5, mainly in terms of differences in configuration from the first embodiment.

As described above, the automatic transmission 1 is configured such that oil is supplied from the oil hole b to the working fluid chamber 27 of the third clutch C3 through the gap B, and lubricating oil is supplied from the oil hole a to the cancel oil chamber 28 through the gap A. The gap B is a gap that extends in the form of a plane between an outer face 71, which is a face of the inner drum 221 that is opposite the outer drum 222, and an inner wall 73 that is an inner face of the outer drum 222. The gap A is a gap that extends in the form of a plane between a rear face 70, which is positioned on a rear face of the outer face 71 of the inner drum 221, and the outer side face of the clutch drum 42 of the fourth clutch C4. The clutch drum 42 is formed such that the portion to the inside in the radial direction slants rearward toward the inside in the radial direction. The inner drum 221 of the clutch drum 22, except for a plurality of projecting portions 72 (which is an example of a plurality of projections) that will be described later, stands roughly vertically. The gap A is a gap that has a space portion A', a central portion of which (in the direction of the input shaft 7) widens in the axial direction, and that narrows toward the outside in the radial direction.

The rib-shaped projecting portions 72 are provided in four locations around the inner circumference of the rear face 70 of the inner drum 221, projecting toward the fourth clutch C4. In the interiors of the projecting portions 72, oil holes b are formed that supply oil to the working fluid chamber 27. The oil holes b pass through the interior of the inner drum 221 and form opening portions b2 in the outer face 71. Note that, in the first embodiment, as shown in the lower half of FIG. 3, the inner drum 221 is formed such that its wall is thick. However, in the present embodiment, as shown in FIG. 4B, the inner drum 221 is formed such that its wall is thin overall (except for the projecting portions 72), thus forming the space portion A' between the inner drum 221 and the clutch drum 42 of the fourth clutch C4. The projecting portions 72 are not limited to four, and there may be three, five, or any number of them.

In the inner drum 221, as shown in FIG. 4A, the oil holes b, oil holes a that supply lubricating oil to the cancel oil chamber 28, and drain holes e are located at different intervals around the circumference of a cylindrical boss portion 22c that is formed to the inside in the radial direction of the inner drum 221. (Note that in FIG. 4B, both one of the oil holes a and one of the drain holes e are shown, but this is done for the convenience of the illustration and shows a cross section that differs in this part from the actual cross section.) The oil holes b, in the same manner as the projecting portions 72, are disposed at four locations on the circumference of the boss portion 22c, and the oil holes a are disposed such that one of the oil holes a is flanked on the left and right by the drain holes e between the oil holes b. Further, to the inside in the radial direction of the oil holes a, b for supplying oil, oil reservoirs a1, b1 are formed such that they are large in the circumferential direction.

Grooves 74 are provided in the inner wall 73 of the outer drum 222, opposite the outer face 71 of the inner drum 221 and facing the opening portions b2 of the oil holes b that are formed in the outer face 71. The grooves 74 extend radially toward the outside in the radial direction on the surface of the inner wall 73. The grooves 74 are formed as long, thin rectangular concave portions that extend over the entire length of the gap B to the working fluid chamber 27. In addition to enlarging the oil passage sectional area of the gap B without widening it in the axial direction, the grooves 74 allow the oil that is supplied from the opening portions b2 of the oil holes b to flow quickly and copiously in the circumferential direction.

In the areas where the projecting portions 72 are not formed on the rear face 70 of the inner drum 221, that is, the areas where the oil holes a and the drain holes e are positioned at equal intervals, the surface of the rear face 70 is formed to be concave where it faces the outer drum 222 (the front direction). The rear face 70, in conjunction with the clutch drum 42 of the fourth clutch C4, forms the gap A that supplies lubricating oil to the cancel oil chamber 28. Forming the rear face 70 such that the concave areas match the oil holes a and the drain holes e enlarges the oil passage sectional area of the gap A without widening it in the axial direction.

In the clutch drum 22 of the third clutch C3, the projecting portions 72 of the inner drum 221 and the grooves 74 of the outer drum 222 are disposed in corresponding positions at equal intervals around the circumference. The concave portions of the rear face 70 of the inner drum 221 and the parts of the inner wall 73 other than the grooves 74 are also disposed in corresponding positions at equal intervals around the circumference. A configuration is thus achieved that has thin walls and high rigidity as a whole.

Note that, in the fourth clutch C4, oil holes c that supply oil to the working fluid chamber 47 and oil holes d that supply lubricating oil to the cancel oil chamber 48 may be located at one of equal intervals and different intervals in the circumferential direction, in the same manner as in the third clutch C3. Grooves may also be formed in a radiating pattern toward the outside in the radial direction on an inner perimeter face of the clutch drum 42 that forms the working fluid chamber 47, in the same manner as in the third clutch C3.

Next, the operation of the third clutch C3 and the fourth clutch C4 will be explained.

In the third clutch C3, the hydraulic pressure that is generated in the working fluid chamber 27 moves the piston member 24 in the axial direction such that the third clutch C3 is engaged and disengaged by the pressing of the piston member 24 on the friction plates 21. The working fluid, under hydraulic pressure that is generated by an oil pump not shown in the drawings, is supplied to the working fluid chamber 27 from the oil holes b that are formed in the clutch drum 22 and through the grooves 74 and the gap B that forms a plane around the entire circumference.

Further, because the centrifugal oil pressure acts in the working fluid chamber 27, lubricating oil is supplied to the cancel oil chamber 28 that flanks the piston member 24 from the oil holes a through the gap A that forms a plane around the entire circumference. This generates centrifugal oil pressure in the cancel oil chamber 28 and counterbalances the centrifugal oil pressure that is generated in the working fluid chamber 27.

In the same manner, in the fourth clutch C4, the working fluid, under hydraulic pressure that is generated by an oil pump not shown in the drawings, is supplied to the working fluid chamber 47 from the oil holes c. This moves the piston member 44 in the axial direction such that the fourth clutch C4 is engaged and disengaged by the pressing of the piston member 44 on the friction plates 41. Lubricating oil is supplied to the cancel oil chamber 48 from the oil holes d, generating centrifugal oil pressure in the cancel oil chamber 48 and counterbalancing the centrifugal oil pressure that is generated in the working fluid chamber 47.

Therefore, when the third clutch C3 is disengaged, the pressurized oil in the working fluid chamber 27 is drained through the gap B, the grooves 74, and the oil holes b, but because the clutch drum 22 is rotating, the centrifugal oil pressure is generated in the working fluid chamber 27. At this time, the energizing force of the return spring 26 and the centrifugal oil pressure that acts on the oil in the cancel oil chamber 48 act on the rear face of the piston member 24, moving the piston member 24 rapidly in the advance and retract directions in resistance to the centrifugal oil pressure in the working fluid chamber 27. The capacity of the cancel oil chamber 28 increases accordingly, but oil is supplied quickly through the gap A between the clutch drums 22 and 42, so no delay occurs in the operating of the third clutch C3.

As explained above, in the automatic transmission 1 according to the present invention, the third clutch C3 is positioned to the outside in the radial direction from the fourth clutch C4 and overlaps the fourth clutch C4 in the axial direction. Arranging the third clutch C3 in a different position in the radial direction makes it possible to configure the clutch unit and the automatic transmission more compactly in the axial direction. In addition, the oil holes b are provided to the inside in the radial direction of the clutch drum 22 of the third clutch C3, and to the outside in the radial direction from the oil holes b, the gap B covers a plane between the clutch drum 22 and the piston support portion 22e. This makes it possible to supply and drain hydraulic pressure quickly to and from the working fluid chamber 27 of the third clutch C3. The forming of the grooves 74 in the gap B also makes it possible to supply and drain hydraulic pressure quickly to and from the working fluid chamber 27 of the third clutch C3.

Furthermore, the gap A between the clutch drum 22 of third clutch C3 and the clutch drum 42 of the fourth clutch C4 is formed as an oil supply passage to the cancel oil chamber 28 of the third clutch C3, and the gap B is used as an oil passage to the working fluid chamber 27. The clutch drum 22 can therefore be configured with thin walls, so it can be made more compact in the axial direction. Finally, even though the grooves 74 are formed in the third clutch C3 and concave portions are formed in the rear face 70 of the inner drum 221, the grooves 74 and the concave portions of the rear face 70 are separated by intervals in the circumferential direction, so the clutch drum 22 of the third clutch C3 can retain high rigidity as a whole.

According to an exemplary aspect of the invention, the clutch drum of the one of the two clutches that is disposed to the outside in the radial direction has the oil passages to the inside in the radial direction and has a second gap that forms a plane to the outside in the radial direction. Hydraulic pressure is supplied to the working fluid chamber of the one of the two clutches that is disposed to the outside in the radial direction through the oil passages and the second gap.

The clutch drum of the one of the two clutches that is disposed to the outside in the radial direction has a boss portion that extends in the axial direction toward the inside in the radial direction, a drum portion that extends in the axial direction toward the outside in the radial direction, a bottom portion that links the boss portion and the drum portion, and a flange portion in a central location in the bottom portion that extends for a short distance in the same direction as do the boss portion and the drum portion. The piston member is disposed such that it links an outer perimeter face of the flange portion in an oil-tight manner to the drum portion. The clutch drum of the other of the two clutches is joined to an inner perimeter face of the flange portion through a spline coupling. The clutch drum is held in place by a snap ring in the boss portion such that it is linked into a single unit with the clutch drum of the one of the two clutches that is disposed to the outside in the radial direction.

A cancel plate that forms the cancel oil chamber of the one of the two clutches that is disposed to the outside in the radial direction is disposed such that it is linked to a step portion of the clutch drum of the other of the two clutches and is held in place in the direction in which the hydraulic pressure of the cancel oil chamber acts. A cancel plate that forms the cancel oil chamber of the other of the two clutches is disposed such that it is held in place in the direction in which the hydraulic pressure of the cancel oil chamber acts by a snap ring in the boss portion of the clutch drum of the one of the two clutches that is disposed to the outside in the radial direction. An attachment load of a return spring that is disposed in the cancel oil chamber of the one of the two clutches that is disposed to the outside in the radial direction (the load when the piston member is not operating and the return spring is not compressed) has a greater energizing force than an operating load of a return spring that is disposed in the cancel oil chamber of the other of the two clutches (the load when the piston member is operating and the return spring is compressed).

According to another exemplary aspect of the present invention, the two clutches are disposed such that they overlap in the axial direction and occupy different positions in the radial direction. This makes it possible for the clutch unit, and therefore the automatic transmission, to be made more compact in the axial direction.

Because the hydraulic servo and the cancel oil chamber of the clutch that is disposed to the outside in the radial direction are disposed respectively to the outside in the radial direction in relation to the working fluid chamber and the cancel oil chamber of the other clutch, oil can be supplied to the cancel oil chamber of the clutch that is disposed to the outside in the radial direction through the gap between the clutch drum of the other clutch and the clutch drum of the clutch that is disposed to the outside in the radial direction. Moreover, the oil can be supplied to the cancel oil chamber through oil passages that have a simple configuration. Thus, the oil can be supplied smoothly to the cancel oil chamber of the clutch that is disposed to the outside in the radial direction, and appropriate clutch timing can be achieved.

In addition, because the oil is supplied to the cancel oil chamber through the gap, which extends in a plane, adequate space can be provided for supplying the oil even though the gap is short in the axial direction. This makes it possible to make the clutch more compact in the axial direction.

According to another exemplary aspect of the present invention, the space portion that extends in the axial direction is formed in the gap, so sufficient centrifugal oil pressure can act reliably on the cancel oil chamber that is disposed to the outside in the radial direction, and the hydraulic pressure can be drained quickly from the working fluid chamber of the one of the two clutches that is disposed to the outside in the radial direction.

According to another exemplary aspect of the present invention, the oil holes that supply oil to and drain oil from the cancel oil chamber of the one of the two clutches that is disposed to the outside in the radial direction are disposed in a line in the space portion, where the projections are not present. This makes it possible to increase the oil passage sectional area to the cancel oil chamber of the one of the two clutches that is disposed to the outside in the radial direction such that oil can be smoothly supplied to and drained from the cancel oil chamber of the one of the two clutches that is disposed to the outside in the radial direction.

According to another exemplary aspect of the present invention, oil passages are provided to the inside in the radial direction of the clutch drum of the one of the two clutches that is disposed to the outside in the radial direction, and the second gap is provided that extends in a plane to the outside in the radial direction. This makes it possible to supply and drain oil quickly to and from the hydraulic servo of the one of the two clutches that is disposed to the outside in the radial direction through the second gap that extends in a plane. Moreover, the second gap allows the portion of the clutch drum that overlaps the working fluid chamber of the other clutch in the radial direction to be formed with thin walls, such that the automatic transmission can be made more compact in the axial direction.

The clutch drum of the one of the two clutches that is disposed to the outside in the radial direction and the clutch drum of the other clutch are formed from separate members. Although the oil supply passages to the cancel oil chamber of the one of the two clutches that is disposed to the outside in the radial direction are formed in the gap between the separate members, the two clutch drums can be linked in the rotation direction and the axial direction into a single unit that has a simple and compact structure.

The cancel plate that forms the cancel oil chamber of the one of the two clutches that is disposed to the outside in the radial direction is disposed such that it is linked to the step portion of the clutch drum of the other of the two clutches and is held in place in the direction in which the hydraulic pressure of the cancel oil chamber acts. The cancel plate that forms the cancel oil chamber of the other of the two clutches is disposed such that it is held in place in the direction in which the hydraulic pressure of the cancel oil chamber acts by a snap ring in the boss portion of the clutch drum of the one of the two clutches that is disposed to the outside in the radial direction. The return spring that is disposed in the cancel oil chamber of the one of the two clutches that is disposed to the outside in the radial direction has a greater energizing force than does the return spring that is disposed in the cancel oil chamber of the other of the two clutches. This makes it possible to constantly maintain the oil passages created by the gap between the two clutches in a specified gap, because the return spring of the one of the two clutches that is disposed to the outside in the radial direction can maintain its energizing force on a specified position in which the two clutch drums are maintained by the snap rings, even in a case where the clutch drum of the other of the two clutches receives a reaction force of the hydraulic pressure, such as when the centrifugal oil pressure is not being generated in the cancel oil chamber, during the piston stroke of the other of the two clutches, and the like.

The automatic transmission that achieves eight forward speeds and at least one reverse speed can be made more compact, particularly in the axial direction.

What is claimed is:

1. An automatic transmission, comprising:
    two clutches that are disposed such that they overlap in an axial direction and occupy different positions in a radial direction, each of the two clutches comprising:
        a clutch drum,
        a piston that forms a working fluid chamber for which a portion of the clutch drum serves as a cylinder,
        a plurality of friction plates that engage the clutch drum, and
        a cancel oil chamber that is disposed on a rear face side of the piston and that cancels a centrifugal oil pressure that acts on the working fluid chamber,
    wherein:
    the working fluid chamber and the cancel oil chamber of one clutch of the two clutches that is disposed outside in the radial direction are respectively disposed to the outside in the radial direction in relation to the working fluid chamber and the cancel oil chamber of the other clutch of the two clutches, and
    oil is supplied to the cancel oil chamber of the one clutch of the two clutches that is disposed to the outside in the radial direction through a gap between the clutch drum of the other clutch of the two clutches and the clutch drum of the one clutch of the two clutches that is disposed to the outside in the radial direction.

2. The automatic transmission according to claim 1, wherein:
    a plurality of projections that project into the gap are disposed in the clutch drum of the one clutch of the two clutches that is disposed to the outside in the radial direction,
    oil passages are formed within the projections in order to supply and drain off hydraulic pressure for the working fluid chamber of the one clutch of the two clutches that is disposed to the outside in the radial direction, and
    a portion of the gap where the projections are not present forms a space portion between the clutch drum of the other clutch of the two clutches and the clutch drum of the one clutch of the two clutches that is disposed to the outside in the radial direction.

3. The automatic transmission according to claim 2, wherein
    oil holes that supply oil to and drain oil from the cancel oil chamber of the one clutch of the two clutches that is disposed to the outside in the radial direction are disposed in a line in the space portion.

4. The automatic transmission according to claim 1, comprising:
    an input shaft to which an input rotation is input from a drive power source;
    a deceleration planetary gear that includes:
        a first sun gear whose rotation is stationary in relation to a case and a stationary member that is an integral part of the case,
        a first carrier that is linked to the input shaft and to which the input rotation is input, and
        a first ring gear that is caused to output a deceleration rotation by the stationary first sun gear and the first carrier;
    and
    a planetary gear set that includes:
        a second sun gear to which the deceleration rotation of the first ring gear is input by an engaging of a first clutch,
        a third sun gear to which the deceleration rotation of the first ring gear is input by an engaging of a third clutch, to which the rotation of the input shaft is input through the first carrier by an engaging of a fourth clutch, and whose rotation is made stationary by an engaging of a first brake,
        a second carrier that has a long pinion that meshes with the third sun gear and a short pinion that meshes with the second sun gear, whose rotation is made stationary by an engaging of a second brake, and to which the rotation of the input shaft is input by an engaging of a second clutch, and
        a second ring gear that meshes with the long pinion and whose rotation is linked to an output member,
    wherein:
    the one clutch of the two clutches that is disposed to the outside in the radial direction is the third clutch,
    the other clutch of the two clutches is the fourth clutch,
    a first forward speed is achieved by engaging the first clutch and engaging the second brake,
    a second forward speed is achieved by engaging the first clutch and engaging the first brake,
    a third forward speed is achieved by engaging the first clutch and the third clutch,
    a fourth forward speed is achieved by engaging the first clutch and the fourth clutch,
    a fifth forward speed is achieved by engaging the first clutch and the second clutch,
    a sixth forward speed is achieved by engaging the second clutch and the fourth clutch,
    a seventh forward speed is achieved by engaging the second clutch and the third clutch,
    an eighth forward speed is achieved by engaging the second clutch and engaging the first brake, and
    a reverse speed is achieved by engaging one of the third clutch and the fourth clutch and engaging the second brake.

5. The automatic transmission according to claim 1, wherein:

the clutch drum of the one clutch of the two clutches that is disposed to the outside in the radial direction includes an inner drum and an outer drum, and the gap is provided between the clutch drum of the other clutch of the two clutches and a piston support portion of the inner drum of the clutch drum of the one clutch of the two clutches that is disposed to the outside in the radial direction.

6. The automatic transmission according to claim 2, wherein the space portion has a central portion that widens in the axial direction and that narrows outside in the radial direction.

* * * * *